US012609723B2

(12) United States Patent
Chang

(10) Patent No.: US 12,609,723 B2
(45) Date of Patent: Apr. 21, 2026

(54) DIGITAL PRE-DISTORTION CIRCUIT AND METHOD FOR REDUCING CLIPPING NOISE IN DIGITAL PRE-DISTORTION CIRCUIT

(71) Applicant: Realtek Semiconductor Corp., HsinChu (TW)

(72) Inventor: Yuan-Shuo Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 6 days.

(21) Appl. No.: 18/780,497

(22) Filed: Jul. 23, 2024

(65) Prior Publication Data

US 2025/0038777 A1     Jan. 30, 2025

(30) Foreign Application Priority Data

Jul. 26, 2023    (TW) ................................. 112127971

(51) Int. Cl.
*H04B 1/04*          (2006.01)

(52) U.S. Cl.
CPC ... *H04B 1/0475* (2013.01); *H04B 2001/0425* (2013.01)

(58) Field of Classification Search
CPC ...................... H04B 1/0475; H04B 2001/0425
USPC ................................................. 375/295–297
See application file for complete search history.

(56) References Cited

U.S. PATENT DOCUMENTS

| | | | |
|---|---|---|---|
| 2004/0246639 A1 * | 12/2004 | Archer .................. | H03F 1/3241 361/58 |
| 2012/0133434 A1 * | 5/2012 | Woo ...................... | H03F 1/3247 330/149 |
| 2017/0054223 A1 * | 2/2017 | Gallagher .............. | H01Q 3/247 |
| 2017/0111188 A1 * | 4/2017 | Deng .................. | H03F 3/45179 |
| 2019/0013991 A1 * | 1/2019 | Duyck .................. | H03F 1/3241 |
| 2019/0165981 A1 * | 5/2019 | Fu ........................ | H04B 1/0475 |
| 2020/0382147 A1 * | 12/2020 | Menkhoff ............ | H04B 1/0475 |
| 2022/0021349 A1 * | 1/2022 | Yan ........................ | H04B 1/62 |
| 2022/0360291 A1 * | 11/2022 | Gustavsson ........... | H03F 1/3247 |
| 2023/0006611 A1 * | 1/2023 | Chen ..................... | H03F 1/3205 |

* cited by examiner

*Primary Examiner* — Emmanuel Bayard
(74) *Attorney, Agent, or Firm* — Winston Hsu

(57) ABSTRACT

A digital pre-distortion circuit and a method for reducing clipping noise in a digital pre-distortion circuit are provided. The digital pre-distortion circuit includes a pre-distorter, a clipping logic, an error extraction circuit, a filter and a compensation circuit. The pre-distorter performs a pre-distortion operation according to an input signal to generate an initial pre-distortion signal, and the clipping logic clips the initial pre-distortion signal to generate a clipped pre-distortion signal. In addition, the error extraction circuit calculates a difference between the initial pre-distortion signal and the clipped pre-distortion signal to generate a clipped error signal, and the filter performs filtering on the clipped error signal to generate a filtered error signal, wherein the compensation circuit compensates the clipped pre-distortion signal according to the filtered error signal to generate an output signal.

8 Claims, 10 Drawing Sheets

DIGITAL PRE-DISTORTION CIRCUIT AND METHOD FOR REDUCING CLIPPING NOISE IN DIGITAL PRE-DISTORTION CIRCUIT

BACKGROUND OF THE INVENTION

1. Field of the Invention

The present invention is related to digital pre-distortion (DPD), and more particularly, to a DPD circuit and a method for reducing clipping noise in a DPD circuit.

2. Description of the Prior Art

Wireless communication devices are typically equipped with radio frequency (RF) power amplifiers (PAS), which amplify transmitted signals in order to cancel energy loss introduced in a transmitting process. The RF PA is a non-linear component. When the transmitted signal has a high peak-to-average power ratio, severe in-band signal distortion may be generated after the transmitted signal is processed by the RF PA. This will degrade a signal quality, and may also cause out-of-band energy leakage to occur at a same time, which results in interference to nearby channels. In order to avoid the above problems, the wireless communication device performs a digital pre-distortion (DPD) processing on a transmitted signal before this transmitted signal is transmitted to the PA. When the DPD processing is performed on a signal having greater amplitude, however, additional noise may be generated such that an out-of-band interference signal will be formed, thereby affecting transmission of nearby channels.

Thus, there is a need for a novel method and associated architecture, in order to solve the problem of the related art without introducing any side effect or in a way that is less likely to introduce side effects.

SUMMARY OF THE INVENTION

An objective of the present invention is to provide a digital pre-distortion (DPD) circuit and a method for reducing clipping noise in a DPD circuit, which can reduce interference to nearby channels caused by counter inter-modulation (CIM) distortion signals within signals output from a wireless communication device.

At least one embodiment of the present invention provides a DPD circuit. The DPD circuit comprises a pre-distorter, a clipping logic, an error extraction circuit, a filter and a compensation circuit, wherein the clipping logic is coupled to the pre-distorter, the error extraction circuit is coupled to the pre-distorter and the clipping logic, the filter is coupled to the error extraction circuit, and the compensation circuit is coupled to the clipping logic and the filter. The pre-distorter is configured to perform a pre-distortion operation according to an input signal to generate an initial pre-distortion signal, and the clipping logic is configured to make at least a portion of an amplitude of the initial pre-distortion signal which exceeds a predetermined range be clipped as an upper bound or a lower bound of the predetermined range, to generate a clipped pre-distortion signal. In addition, the error extraction circuit is configured to calculate a difference between the initial pre-distortion signal and the clipped pre-distortion signal to generate a clipped error signal, and the filter is configured to filter the clipped error signal to generate a filtered error signal, wherein the compensation circuit is configured to compensate the clipped pre-distortion signal according to the filtered error signal to generate an output signal.

At least one embodiment of the present invention provides a method for reducing clipping noise in a DPD circuit. The method comprises: utilizing a pre-distorter of the DPD circuit to perform a pre-distortion operation according to an input signal to generate an initial pre-distortion signal; utilizing a clipping logic of the DPD circuit to make at least a portion of an amplitude of the initial pre-distortion signal which exceeds a predetermined range be clipped as an upper bound or a lower bound of the predetermined range, to generate a clipped pre-distortion signal; utilizing an error extraction circuit of the DPD circuit to calculate a difference between the initial pre-distortion signal and the clipped pre-distortion signal to generate a clipped error signal; utilizing a filter of the DPD circuit to filter the clipped error signal to generate a filtered error signal; and utilizing a compensation circuit of the DPD circuit to compensate the clipped pre-distortion signal according to the filtered error signal to generate an output signal.

The DPD circuit and the method provided by the embodiments of the present invention can transmit the noise generated by signal clipping to the filter for processing, in order to extract components of specific frequency bands, and further complement the clipped pre-distortion signal by the filtered result. Even though in-band noise is still unable to be completely removed from the final output signal, out-of-band noise can be greatly reduced. Thus, the present invention can prevent the nearby channels from interference from the CIM distortion signals. Furthermore, the embodiments of the present invention will not greatly increase additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
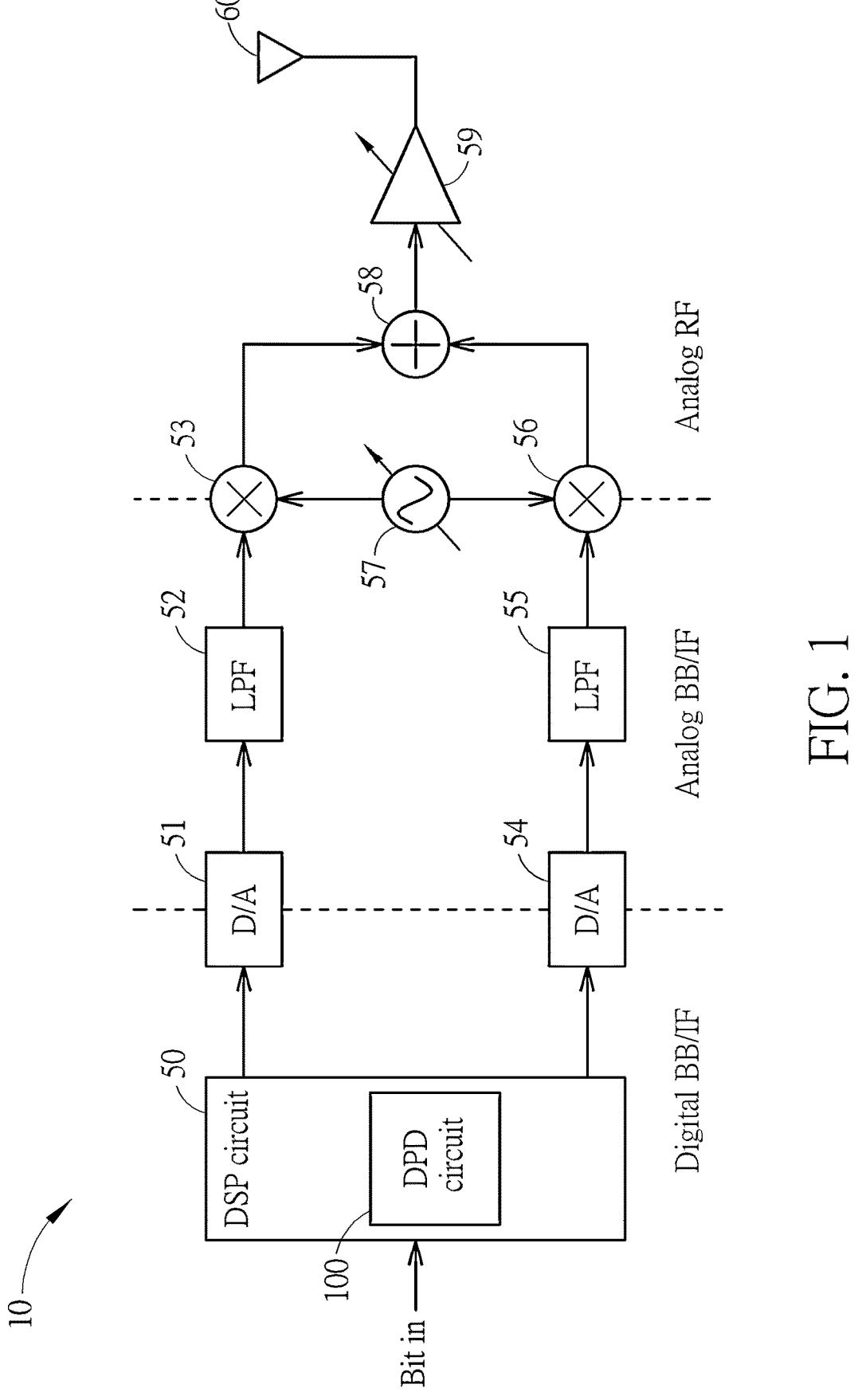
FIG. 1 is a diagram illustrating a wireless communication device according to an embodiment of the present invention.

FIG. 1 is a diagram illustrating a wireless communication device 10 (e.g. a Wi-Fi system) according to an embodiment of the present invention. As shown in FIG. 1, the wireless communication device 10 may comprise a digital signal processing (DSP) circuit 50, digital-to-analog converters (DACs) 51 and 54 (labeled "D/A" in FIG. 1 for brevity), low pass filters (LPFs) 52 and 55, up-converters 53 and 56, a local oscillator (LO) 57, a signal combiner 58, a radio frequency (RF) power amplifier (PA) 59 and an antenna 60. In the wireless communication device 10, the DSP circuit 50 may receive a digital input signal (labeled "Bits in" in FIG. 1 for brevity), and an in-phase signal and a quadrature signal (e.g. a signal having a 90-degree phase shift) may be transmitted to the signal combiner 58 via two channels such as an in-phase signal channel (referred to as an I-channel) and a quadrature signal channel (referred to as a Q-channel), respectively. The RF PA 59 may amplify a combined signal which is then output to the antenna 60 for being transmitted. In detail, the signals output from the DSP circuit 50 are digital baseband (BB) or intermediate frequency (IF) signals. The DACs 51 and 54 may perform digital-to-analog conversions on the digital BB/IF signals of respective channels to generate analog BB/IF signals. The up-converters 53 and 56 may perform up-conversions on the analog BB/IF signals of respective channels according to a local oscillation signal output from the LO 57 to generate an analog RF signal.

In order to cancel nonlinear distortion generated by the RF PA 59, the DSP circuit 50 may be equipped with associated operations of DPD processing, where the DPD processing may be implemented according to a reverse function of the RF PA 59. For example, the DSP circuit 50 may perform the DPD processing on the digital input signal based on a reverse function corresponding to a nonlinear behavior of the RF PA 50, to make the DPD processing operations cancel the nonlinear distortion of the RF PA 50 in order to derive an output signal with good linearity. A presentable value range (e.g. a value range that is able to be presented) of a DPD signal generated by the DPD processing is limited, however. For example, when the DPD signal is implemented by an 8-bit digital code, the presentable value range of the DPD signal of the DPD signal is 00000000 to 11111111. When an amplitude of the digital input signal is too large, therefore making the DPD signal generated by calculation of the aforementioned reverse function having a peak exceeding the presentable value range (e.g. lower than 00000000 or higher than 11111111), hard clipping may occur in the DPD signal. For example, the portion that exceeds this value range is clipped as a maximum presentable value such as 11111111 or a minimum presentable value such as 00000000, and clipping noise is therefore generated. Based on spectrum analysis of the hard clipping result mentioned above, the DPD signal which is clipped may have odd-order harmonics such as a third-order harmonic, a fifth-order harmonic and a seventh-order harmonic. If I/Q-channel signals with these odd-order harmonics undergo direct up-conversion to be modulated as RF signals without other processing, counter intermodulation (CIM) distortion signals such as third-order CIM (CIM3) and fifth-order CIM (CIM5) will occur. More particularly, when an orthogonal frequency division multiple access (OFDMA) technique is utilized, channels may be divided into multiple sub-channels such as resource units (RUS). As any one of the RUs occupies a portion of a bandwidth only, the CIM distortion signals mentioned above are more likely to occur in out-of-band and interfere with nearby channels.

In this embodiment, the wireless communication device 10 may further comprise a DPD circuit 100, where the DPD circuit 100 may be installed in the DSP circuit 50, but the present invention is not limited thereto. More particularly, the DPD circuit 100 may provide a corresponding reverse function according to an estimation result of estimating the nonlinear distortion of the RF PA 59 for performing the DPD processing, and may further provide a corresponding mechanism to eliminate or reduce impact of the aforementioned clipping noise.

Figure 2:
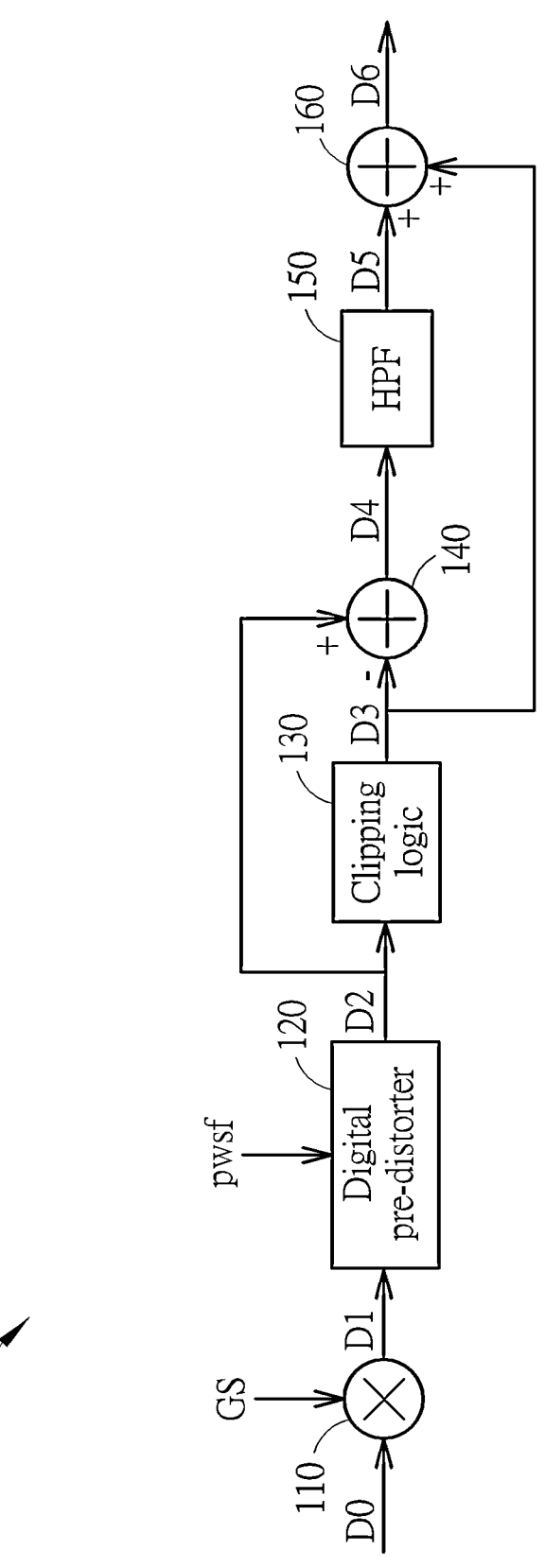
FIG. 2 is a diagram illustrating a digital pre-distortion (DPD) circuit according to an embodiment of the present invention.

FIG. 2 is a diagram illustrating the DPD circuit 100 according to an embodiment of the present invention. As shown in FIG. 2, the DPD circuit 100 may further comprise a signal scaling circuit 110, a pre-distorter such as a digital pre-distorter 120, a clipping logic 130, an error extraction circuit 140, a filter such as a high pass filter (HPF) 150, and a compensation circuit 160. The digital pre-distorter 120 is coupled to the signal scaling circuit 110. The clipping logic 130 is coupled to the digital pre-distorter 120. The error extraction circuit 140 is coupled to the digital pre-distorter 120 and the clipping logic 130. The HPF 150 is coupled to the error extraction circuit 140. The compensation circuit 160 is coupled to the clipping logic 130 and the HPF 150.

In this embodiment, the digital pre-distorter 120 may perform a pre-distortion operation according to an input signal D0 to generate an initial pre-distortion signal D2, where the pre-distortion operation is performed according to an estimation result pwsf of estimating the nonlinear distortion of the RF PA 59. For example, the signal scaling circuit 110 may reduce an amplitude of the input signal D0 based on a scaling rate GS to generate a scaled signal D1. The digital pre-distorter 120 may perform the pre-distortion operation on the scaled signal D1 to generate the initial pre-distortion signal D2. In some embodiments, the signal scaling circuit 110 may be omitted. For example, the digital pre-distorter 120 may perform the pre-distortion operation on the input signal D0 to generate the initial pre-distortion signal D2 without reducing the amplitude of the input signal D0, but the present invention is not limited thereto.

In this embodiment, the clipping logic 130 may make at least a portion of the amplitude of the initial pre-distortion signal D2 which exceeds a predetermined range be clipped as an upper bound or a lower bound of the predetermined range, to generate a clipped pre-distortion signal D3. In addition, the error extraction circuit 140 may calculate a difference between the initial pre-distortion signal D2 and the clipped pre-distortion signal D3 to generate a clipped error signal D4, where the clipped error signal D4 may be an example of the clipping noise mentioned above. The HPF 150 may filter the clipped error signal D4 (e.g. performing high pass filtering on the clipped error signal D4) to generate a filtered error signal D5, where the filtered error signal D5 may be regarded as components of specific frequency bands (e.g. out-of-band components or high-frequency components) in the clipping noise which is generated during the operation of the clipped logic 130. The compensation circuit 160 may compensate the clipped pre-distortion signal D3 according to the filtered error signal D5 to generate an output signal D6, where out-of-band clipping noise in the output signal D6 can be effectively eliminated or reduced.

In this embodiment, the initial pre-distortion signal D2 may be an initial DPD signal, and the upper bound or the lower bound of the predetermined range is determined according to a maximum digital value (e.g. all bits of the initial DPD signal are "1") or a minimum digital value (e.g. all bits of the initial DPD signal are "0") of the initial DPD signal. In addition, the error extraction circuit 140 may be a subtracter configured to subtract the clipped pre-distortion signal D3 from the initial pre-distortion signal D2 to generate the clipped error signal D4, and the compensation circuit 160 may be an adder configured to add the filtered error signal D5 to the clipped pre-distortion signal D3 for generating the output signal D6. In some embodiments, the error extraction circuit 140 may subtract the initial pre-distortion signal D2 from the clipped pre-distortion signal D3 to generate the clipped error signal D4, and implementation of the compensation circuit 160 may be replaced with a subtracter, in order to subtract the filtered error signal D5 from the clipped pre-distortion signal D3 for generating the output signal D6, but the present invention is not limited thereto. As long as out-of-band components of the clipping noise within the clipped pre-distortion signal D3 can be eliminated or reduced when generating the output signal D6, implementations of detailed calculation of the error extraction circuit 140 (e.g. the subtracter) and the compensation circuit 160 (e.g. the adder) may vary.

Figure 3:
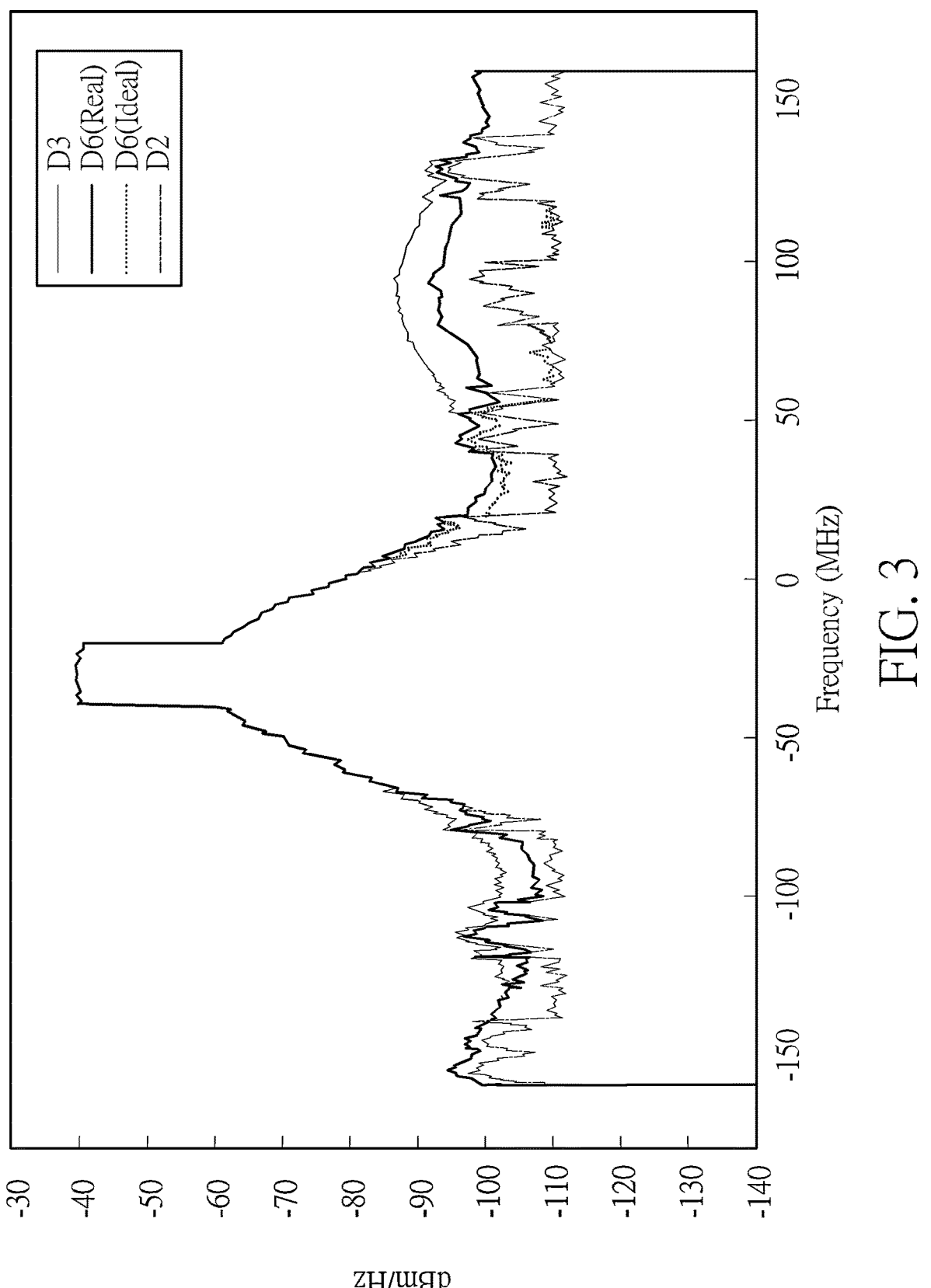
FIG. 3 is a diagram illustrating a spectrum of some signals in the DPD circuit shown in FIG. 2 according to an embodiment of the present invention.

FIG. 3 is a diagram illustrating a spectrum of some signals such as the initial pre-distortion signal D2, the clipped pre-distortion signal D3 and the output signal D6 in the DPD circuit 100 shown in FIG. 2 according to an embodiment of the present invention. As shown in FIG. 3, as the initial pre-distortion signal D2 is not clipped, the initial pre-distortion signal D2 does not have clipping noise therein. After processing of the clipping logic 130, the clipping noise of the clipped pre-distortion signal D3 may occur in out-of-band (e.g. a band of 50 MHz to 150 MHz). By a clipping noise reduction mechanism of the present invention, the clipping noise in the out-of-band can be removed from the output signal D6 under an ideal condition, in order to make a signal quality of the out-of-band be identical to that of the initial pre-distortion which is not clipped. In practice, the output signal D6 still has signal amplitudes exceeding the range at some time points, i.e. the clipping noise of the out-of-band cannot be perfectly removed. Comparing the result shown in FIG. 3 with directly outputting the clipped pre-distortion signal D3, however, the clipping noise of the output signal D6 can be greatly reduced.

Figure 4:
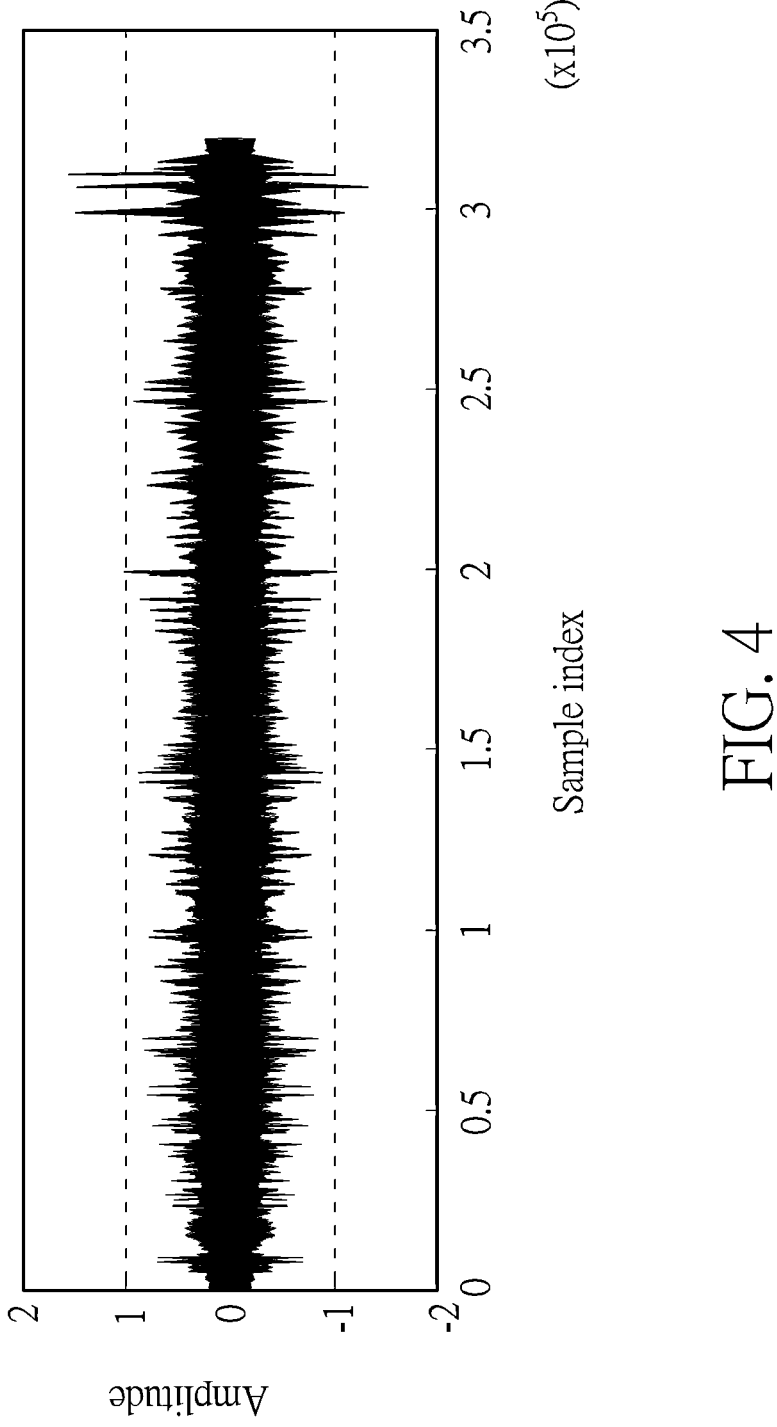
FIG. 4 is a diagram illustrating an initial pre-distortion signal in the DPD circuit shown in FIG. 2 according to an embodiment of the present invention.
Figure 5:
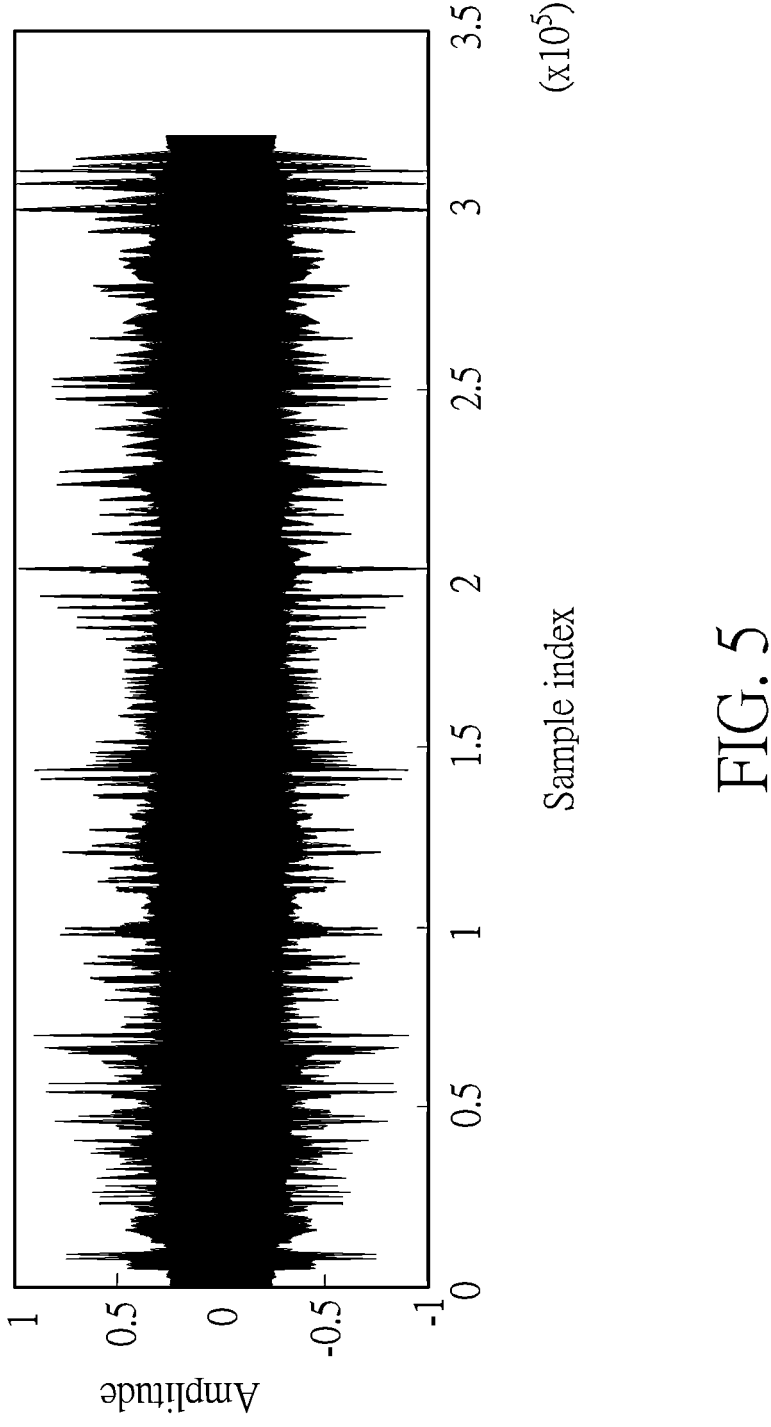
FIG. 5 is a diagram illustrating a clipped pre-distortion signal in the DPD circuit shown in FIG. 2 according to an embodiment of the present invention.

FIG. 4 is a diagram illustrating the initial pre-distortion signal D2 in the DPD circuit 100 shown in FIG. 2 according to an embodiment of the present invention, where amplitudes "1" and "−1" may represent a maximum presentable value and a minimum presentable value of a digital signal output from the clipping logic 130. Thus, the clipping logic 130 may make signal samples of the initial pre-distortion signal D2 which are greater than "1" be clipped as "1", and make signal samples of the initial pre-distortion signal D2 which are less than "1" be clipped as "−1", to generate the clipped pre-distortion signal D3, as shown in FIG. 5. In the embodiment of FIG. 4, signal samples exceeding the aforementioned range in the initial pre-distortion signal D2 may occur around a sample index of $(3 \times 10^5)$. Thus, non-zero signal samples of the clipped error signal D4 output from the error extraction circuit 140 (e.g. the subtracter) may occur around the sample index of $(3 \times 10^5)$ in FIG. 6.

Figure 6:
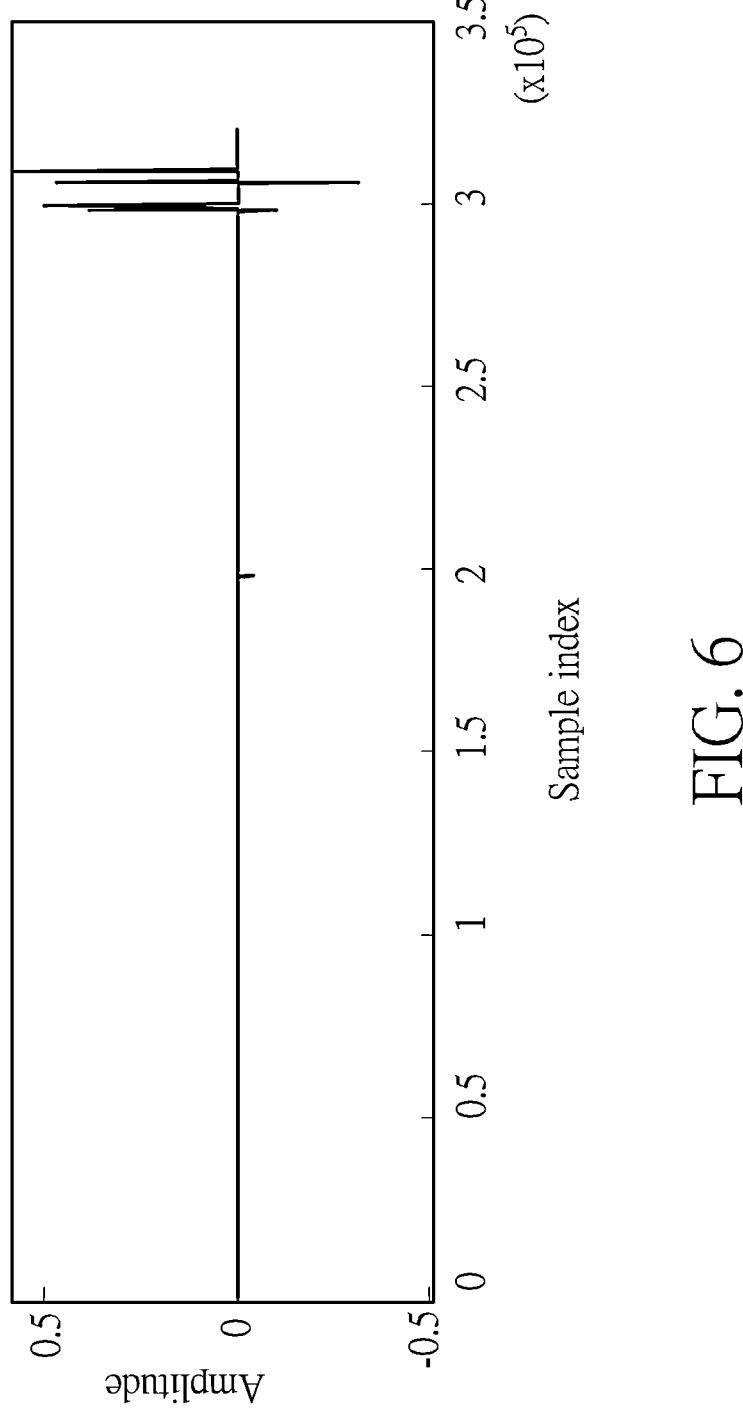
FIG. 6 is a diagram illustrating a clipped error signal in the DPD circuit shown in FIG. 2 according to an embodiment of the present invention.
Figure 7:
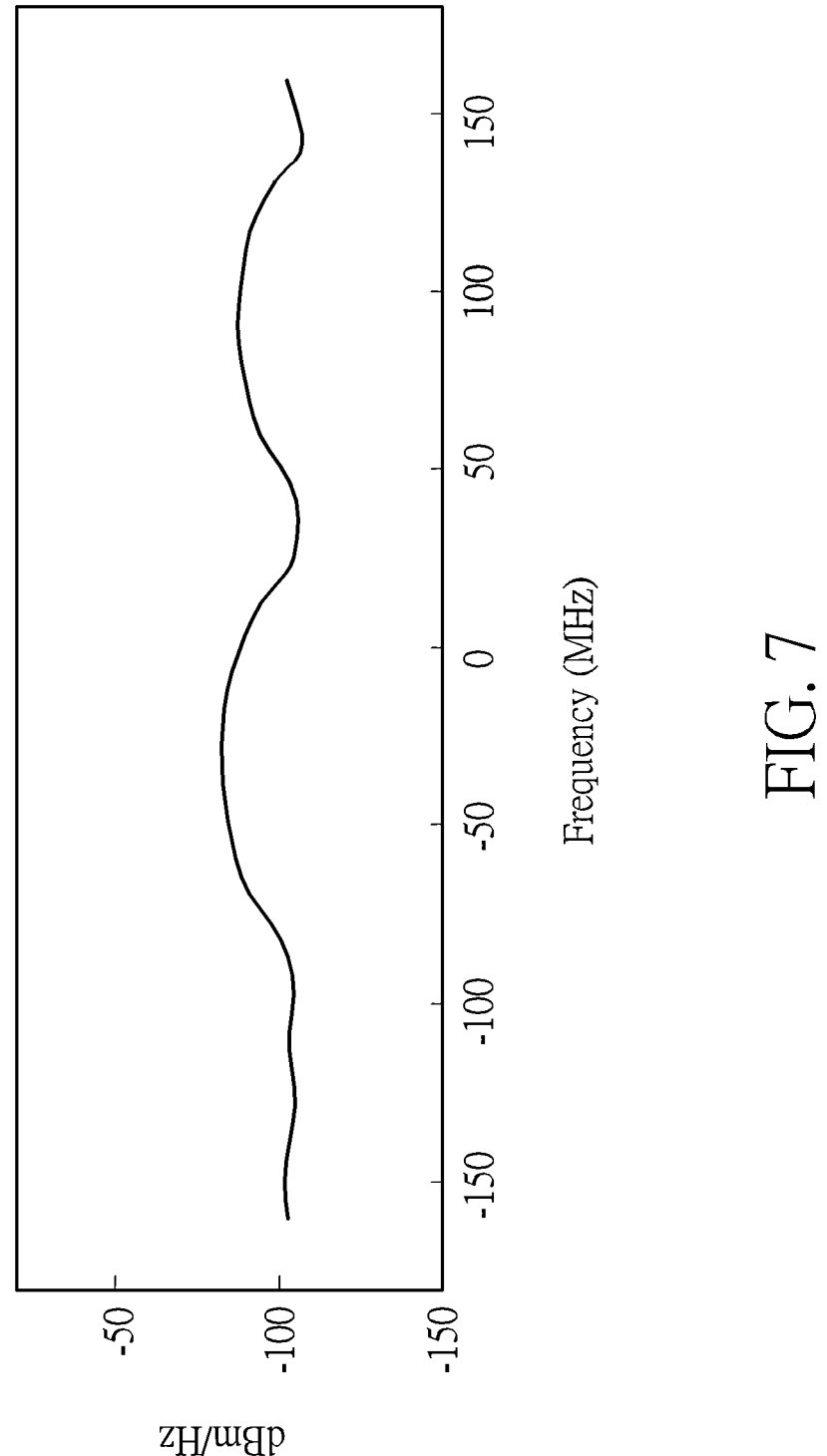
FIG. 7 is a diagram illustrating a spectrum of a clipped error signal in the DPD circuit shown in FIG. 2 according to an embodiment of the present invention.
Figure 8:
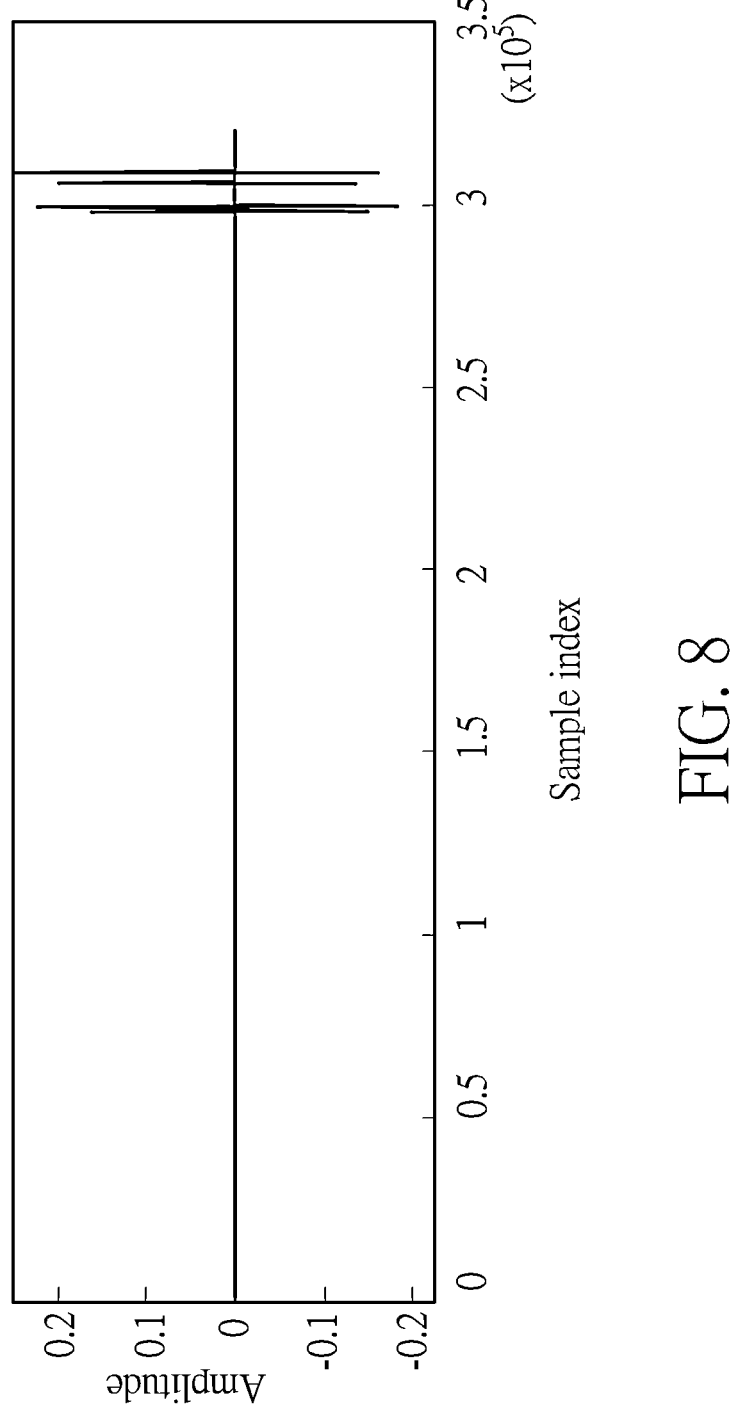
FIG. 8 is a diagram illustrating a filtered error signal in the DPD circuit shown in FIG. 2 according to an embodiment of the present invention.
Figure 9:
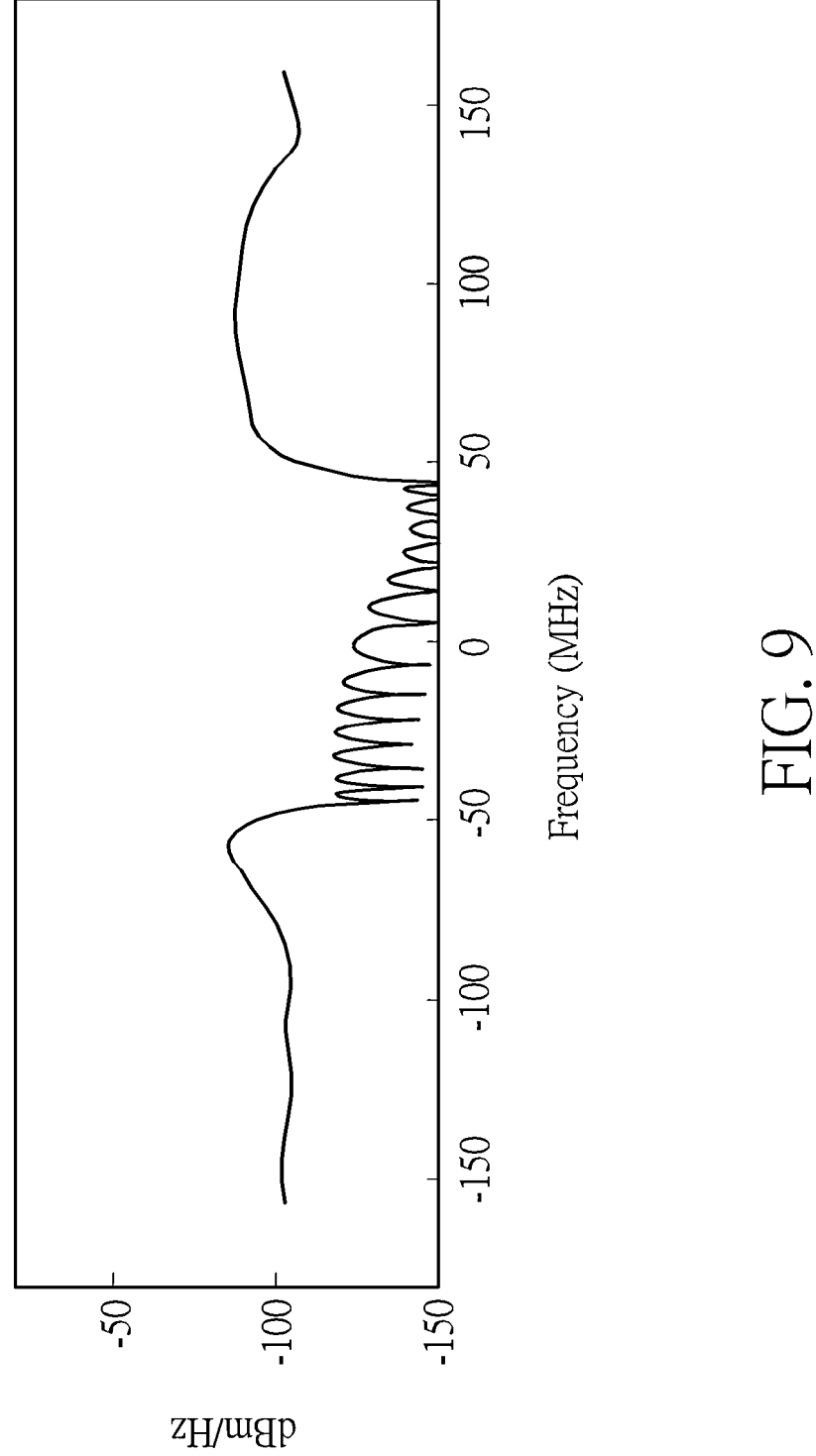
FIG. 9 is a diagram illustrating a spectrum of a filtered error signal in the DPD circuit shown in FIG. 2 according to an embodiment of the present invention.

FIG. 7 is a diagram illustrating a spectrum of the clipped error signal D4 in the DPD circuit 100 shown in FIG. 2 according to an embodiment of the present invention, where the spectrum of the clipped error signal D4 may be regarded as an example of the clipping noise generated by the clipping logic 130. FIG. 8 is a diagram illustrating the filtered error signal D5 in the DPD circuit 100 shown in FIG. 2 according to an embodiment of the present invention, and FIG. 9 is a diagram illustrating a spectrum of the filtered error signal D5 in the DPD circuit 100 shown in FIG. 2 according to an embodiment of the present invention. As shown in FIG. 8, after processing of the HPF 150, as components of specific frequency bands in the filtered error signal D5 are suppressed or reduced, in comparison with the clipped error signal D4 shown in FIG. 6, an amplitude of the filtered error signal D5 is reduced. Furthermore, in comparison with the spectrum of the clipped error signal D4 shown in FIG. 7, in-band components (e.g. in-band clipping noise) in the spectrum of the filtered error signal D5 shown in FIG. 9 are eliminated or reduced, and out-of-band components (e.g. out-of-band clipping noise) in the spectrum of the filtered error signal D5 are maintained for cancelling or reducing the out-of-band clipping noise within the clipped pre-distortion signal D3.

Figure 10:
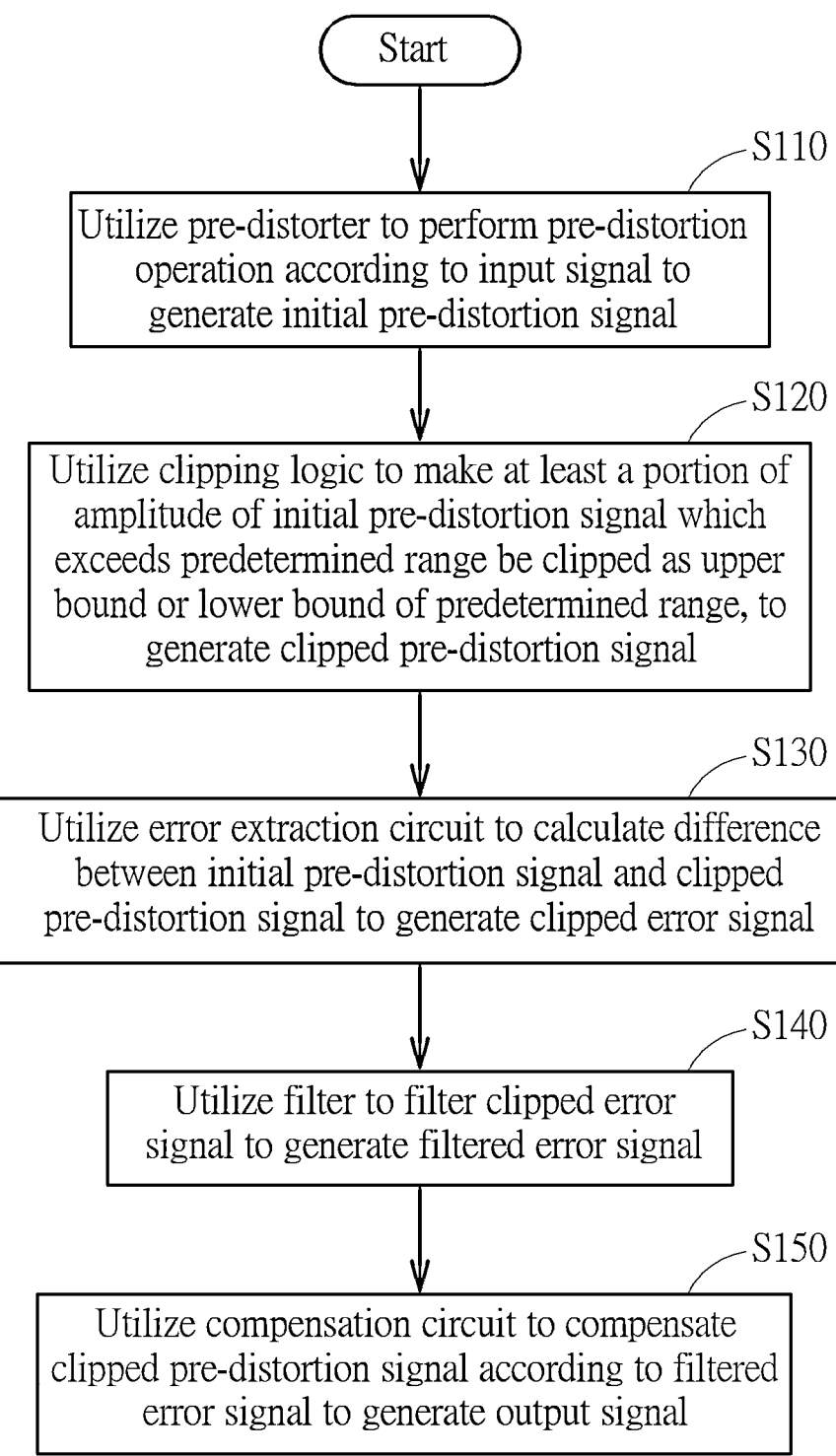
FIG. 10 is a diagram illustrating a working flow of a method for reducing clipping noise in a DPD circuit according to an embodiment of the present invention.

FIG. 10 is a diagram illustrating a working flow of a method for reducing clipping noise in a DPD circuit (e.g. the DPD circuit 100 shown in FIG. 2) according to an embodiment of the present invention. It should be noted that the working flow shown in FIG. 10 is for illustrative purposes only, and is not meant to be a limitation of the present invention. For example, one or more steps may be added, deleted or modified in the working flow shown in FIG. 10. In addition, if a same result can be obtained, these steps do not have to be executed in the exact order shown in FIG. 10.

In Step S110, the DPD circuit may utilize a pre-distorter therein to perform a pre-distortion operation according to an input signal to generate an initial pre-distortion signal.

In Step S120, the DPD circuit may utilize a clipping logic therein to make at least a portion of an amplitude of the initial pre-distortion signal which exceeds a predetermined range be clipped as an upper bound or a lower bound of the predetermined range, to generate a clipped pre-distortion signal.

In Step S130, the DPD circuit may utilize an error extraction circuit therein to calculate a difference between the initial pre-distortion signal and the clipped pre-distortion signal to generate a clipped error signal.

In Step S140, the DPD circuit may utilize a filter therein to filter the clipped error signal to generate a filtered error signal.

In Step S150, the DPD circuit may utilize a compensation circuit therein to compensate the clipped pre-distortion signal according to the filtered error signal to generate an output signal.

It should be noted that the higher the scaling rate GS of the signal scaling circuit 110, the lower the amplitude of the scaled signal D1 transmitted to the digital pre-distorter 120. In some embodiments, the clipped pre-distortion signal D3 output from the clipping logic 130 may be an output signal of the DPD circuit 100 to be transmitted to the DAC 51 or 54 for further processing, where the signal scaling circuit 110 needs to increase the scaling rate GS to ensure that amplitudes of signals received and output by the digital pre-distorter 120 are sufficiently low. This prevents operations of the clipping logic 130 from generating too much clipping noise, thereby solving the problem of the aforementioned inter-channel interference caused by the clipping noise. If, however, the scaling rate GS of the signal scaling circuit 110 is increased (i.e. the amplitudes of the signals received and output by the digital pre-distorter 120 are lowered), a gain of the RF PA 59 of a backend needs to be increased, which greatly increases a complexity and costs of implementing the RF PA 59. In comparison with directly outputting the clipped pre-distortion signal D3, the output signal D6 generated by the error extraction circuit 140, the HPF 150 and the compensation circuit 160 proposed in the present invention can have lower out-of-band clipping noise. Thus, if the output signal D6 is transmitted to the DAC 51 or 54 for further processing, the scaling rate GS of the signal scaling circuit 110 can be reduced (e.g. the amplitudes of the signals received and output by the digital pre-distorter 120 can be increased), enabling the complexity and costs of the RF PA 59 to be effectively reduced.

In some embodiments, the clipped pre-distortion signal D3 output from the clipping logic 130 may be transmitted to a low pass filter to eliminate or reduce the out-of-band clipping noise therein, and an output of this low pass filter may be transmitted to the DAC 51 or 54 for further processing. In comparison with this low pass filter which needs to process the clipped pre-distortion signal D3 having an entire dynamic range (e.g. having an amplitude varying between "1" and "−1" as shown in FIG. 5), the signal processed by the HPF 150 of the present invention is the difference between the initial pre-distortion signal D2 and the clipped pre-distortion signal D3, such as the clipped error signal D4. As a signal dynamic range (e.g. a signal amplitude varying between "0.5" and "−0.5" as shown in FIG. 6) of the clipped error signal D4 is less than a signal dynamic range of the clipped pre-distortion signal D3, the complexity and costs of implementing the HPF 150 can be less than the aforementioned low pass filter.

To summarize, the DPD circuit provided by the embodiments of the present invention can utilize error extraction, filtering and compensation operations thereof to effectively eliminate or reduce the out-of-band clipping noise, to thereby prevent the signals of nearby channels from interference. In addition, the embodiments of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital pre-distortion (DPD) circuit, comprising:
   a pre-distorter, configured to perform a pre-distortion operation according to an input signal to generate an initial pre-distortion signal;
   a clipping logic, coupled to the pre-distorter, configured to make at least a portion of an amplitude of the initial pre-distortion signal which exceeds a predetermined range be clipped as an upper bound or a lower bound of the predetermined range, to generate a clipped pre-distortion signal;
   an error extraction circuit, coupled to the pre-distorter and the clipping logic, configured to calculate a difference between the initial pre-distortion signal and the clipped pre-distortion signal to generate a clipped error signal;

a filter, coupled to the error extraction circuit, configured to filter the clipped error signal to generate a filtered error signal; and
   a compensation circuit, coupled to the clipping logic and the filter, configured to compensate the clipped pre-distortion signal according to the filtered error signal to generate an output signal;
   wherein the initial pre-distortion signal is an initial DPD signal, and the upper bound or the lower bound of the predetermined range is determined according to a maximum digital value or a minimum digital value of the initial DPD signal.

2. The DPD circuit of claim 1, wherein the filter is a high pass filter configured to perform high pass filtering on the clipped error signal to generate the filtered error signal.

3. The DPD circuit of claim 1, further comprising:
   a signal scaling circuit, coupled to the pre-distorter, configured to reduce an amplitude of the input signal to generate a scaled signal;
   wherein the pre-distorter is configured to perform the pre-distortion operation on the scaled signal to generate the initial pre-distortion signal.

4. The DPD circuit of claim 1, wherein the error extraction circuit is a subtracter configured to subtract the clipped pre-distortion signal from the initial pre-distortion signal to generate the clipped error signal, and the compensation circuit is an adder configured to add the filtered error signal to the clipped pre-distortion signal to generate the output signal.

5. A method for reducing clipping noise in a digital pre-distortion (DPD) circuit, comprising:
   utilizing a pre-distorter of the DPD circuit to perform a pre-distortion operation according to an input signal to generate an initial pre-distortion signal;
   utilizing a clipping logic of the DPD circuit to make at least a portion of an amplitude of the initial pre-distortion signal which exceeds a predetermined range be clipped as an upper bound or a lower bound of the predetermined range, to generate a clipped pre-distortion signal;
   utilizing an error extraction circuit of the DPD circuit to calculate a difference between the initial pre-distortion signal and the clipped pre-distortion signal to generate a clipped error signal;
   utilizing a filter of the DPD circuit to filter the clipped error signal to generate a filtered error signal; and
   utilizing a compensation circuit of the DPD circuit to compensate the clipped pre-distortion signal according to the filtered error signal to generate an output signal;
   wherein the initial pre-distortion signal is an initial DPD signal, and the upper bound or the lower bound of the predetermined range is determined according to a maximum digital value or a minimum digital value of the initial DPD signal.

6. The method of claim 5, wherein utilizing the filter of the DPD circuit to filter the clipped error signal to generate the filtered error signal comprises:
   utilizing a high pass filter to perform high pass filtering on the clipped error signal to generate the filtered error signal.

7. The method of claim 5, further comprising:
   utilizing a signal scaling circuit of the DPD circuit to reduce an amplitude of the input signal to generate a scaled signal;

wherein utilizing the pre-distorter of the DPD circuit to perform the pre-distortion operation according to the input signal to generate the initial pre-distortion signal comprises:

utilizing the pre-distorter to perform the pre-distortion operation on the scaled signal to generate the initial pre-distortion signal.

8. The method of claim 5, wherein utilizing the error extraction circuit of the DPD circuit to calculate the difference between the initial pre-distortion signal and the clipped pre-distortion signal to generate the clipped error signal comprises:

utilizing a subtracter to subtract the clipped pre-distortion signal from the initial pre-distortion signal to generate the clipped error signal;

wherein utilizing the compensation circuit of the DPD circuit to compensate the clipped pre-distortion signal according to the filtered error signal to generate the output signal comprises:

utilizing an adder to add the filtered error signal to the clipped pre-distortion signal to generate the output signal.

* * * * *